(12) United States Patent
Vergnet (10) Patent No.: US 12,196,681 B1
(45) Date of Patent: Jan. 14, 2025

(54) METHOD AND A DEVICE FOR DETECTING CRYSTALLINE DEFECTS IN A SUBSTRATE BY DARK FIELD AND PHOTOLUMINESCENCE

(71) Applicant: UNITY SEMICONDUCTOR, Montbonnot-Saint-Martin (FR)

(72) Inventor: Hadrien Vergnet, Saint-Martin d'Hères (FR)

(73) Assignee: UNITY SEMICONDUCTOR, Montbonnot-Saint-Martin (FR)

( * ) Notice: Subject to any disclaimer, the term of this patent is extended or adjusted under 35 U.S.C. 154(b) by 0 days.

(21) Appl. No.: 18/770,918

(22) Filed: Jul. 12, 2024

(30) Foreign Application Priority Data

Dec. 18, 2023 (EP) ..................................... 23307250

(51) Int. Cl.
*G01N 21/64* (2006.01)
*G01N 21/95* (2006.01)

(52) U.S. Cl.
CPC ..... *G01N 21/6489* (2013.01); *G01N 21/6456* (2013.01); *G01N 21/9505* (2013.01)

(58) Field of Classification Search
CPC ........... G01N 21/6489; G01N 21/6456; G01N 21/9505
See application file for complete search history.

(56) References Cited

U.S. PATENT DOCUMENTS 5,581,346 A * 12/1996 Sopori ............... G01N 21/9501
356/30
6,403,947 B1 * 6/2002 Hoyt ...................... B82Y 10/00
356/417
9,551,672 B2 1/2017 Seki et al.
2016/0307810 A1 10/2016 Mori
2018/0188188 A1 * 7/2018 Zhao .................. G01N 21/9501

FOREIGN PATENT DOCUMENTS

EP 3165903 A1 5/2017
JP 2015119167 A 6/2015

OTHER PUBLICATIONS

Communication and Search Report received for European Application No. 23307250.3, Jun. 7, 2024.

* cited by examiner

*Primary Examiner* — David P Porta
*Assistant Examiner* — Fani Polyzos Boosalis
(74) *Attorney, Agent, or Firm* — Greer, Burns & Crain, Ltd (57) ABSTRACT

A device for detecting monocrystalline substrate defects, wherein a normal to the surface of the substrate is tilted by a tilt angle being contained in an angle plane, perpendicular to the surface, the device includes a detector, an illumination light source having a light beam, and arranged in a first position and/or a second position, an excitation light source illuminating the substrate and producing an emission of photoluminescence light by the substrate, imaging means imaging the substrate according to a detector field of view producing at least one image of the substrate, and processing means detecting crystalline defects using the substrate image, each illumination light source and the imaging means are arranged in a dark-field configuration, and in the first position, the illuminating light beam is parallel or quasi-parallel to the angle plane, and in the second position, the illuminating light beam is parallel or quasi-parallel to a perpendicular plane.

16 Claims, 8 Drawing Sheets

FIG. 10

METHOD AND A DEVICE FOR DETECTING CRYSTALLINE DEFECTS IN A SUBSTRATE BY DARK FIELD AND PHOTOLUMINESCENCE

BACKGROUND

The present invention relates to a device for detecting crystalline defects in monocrystalline substrates, such as silicon carbide substrates. It also relates to a method implemented by such a device.

The field of the invention is the field of inspection and characterization of semiconductor substrates by optical methods.

Monocrystalline substrates or wafers for electronics, optics, or optoelectronics applications, need to be inspected to detect, identify, and/or characterize possible crystalline defects present on their surface or below their surface. Crystalline defects are defects resulting from the fact that the atoms arrange locally in an unexpected way during the growth of the crystal. This can result in subsequent defects or causes of failure in the components, such as transistors or diodes, fabricated with these substrates.

Such substrates include notably silicon carbide (SiC), which is grown as a monocrystalline boule, and then usually sliced in wafers according to a specific orientation with respect to the crystalline axis, usually referred to as "off axis", and possibly provided with one or more additional monocrystalline layer(s) added on top by an epitaxial process. Such wafers are in particular used to manufacture power components, for instance for the automotive industry or other power-related applications. Other materials such as silicon (Si) can also be provided as monocrystalline off axis substrates or wafers.

The crystalline defects can be very detrimental to the performance and the reliability of these components. It is therefore important to detect such defects at an early stage.

Several measurement techniques are known to detect and classify crystalline defects, such as dark-field detection, photoluminescence detection, or combinations of these techniques.

Dark-field detection allows revealing the defects present at the surface of a substrate. This technique is based on an illumination of the surface and the collection of the scattered light. The illumination is arranged with an angle of incidence such that the specular reflection is not collected.

Dark-field detection systems are quite simple and efficient. However, they are not specific or selective enough to allow for detecting and classifying crystalline defects. It is for instance difficult to distinguish with such technique crystalline defects from other defects, such as particles contaminating the surface of the substrate, or scratches or pits due to external causes non-related to the crystalline growth.

Some substrates exhibit photoluminescent behaviour. Photoluminescence properties can be intrinsic to the material or can be due to doping or crystalline defects present in the thickness of the substrate.

Photoluminescence is manifested by certain materials which, when subjected to an excitation radiation of a certain wavelength, emit a radiation of a different wavelength. Examples of materials showing such behaviour include compound semiconductors, such as indium phosphide, gallium arsenide, or silicon carbide. Such materials have applications in the semiconductor industry, for instance for electric vehicles or other power-related applications, thanks to their ability to handle higher power and/or higher frequencies than classic silicon-based electronics.

The photoluminescent behaviour can be exploited to characterize these materials. In particular, the photoluminescent behaviour of the material can be locally modified by the presence of crystalline defects, and thus bring information on them. In that case, the materials are illuminated by a light beam presenting a wavelength short enough so that the energy is greater than the bandgap energy of the material, and the resulting photoluminescence radiations are detected in various wavelengths, for instance in the near ultraviolet, visible, or infrared spectra.

Photoluminescence alone usually doesn't allow a sufficiently detailed characterization of crystalline defects in substrates such as silicon carbide. This technique is therefore frequently combined with other techniques such as differential interference contrast (DIC), light reflection, and light scattering on the surface. An example of a defect characterization technique combining DIC and photoluminescence can be found in U.S. Pat. No. 9,551,672 B2, to address the specific problem of detecting basal plane dislocations in SiC.

A major difficulty with the devices of the prior art is to allow detecting, and more importantly classifying properly, a large variety of crystalline defects in substrates such as SiC.

SUMMARY

A purpose of the present invention is to overcome at least one of the drawbacks of the known techniques.

A purpose of the present invention is to provide a device and a method for the detection of crystalline defects in off-axis, monocrystalline substrates, such as silicon carbide substrates, or silicon substrates.

Another purpose of the invention is to provide a device for detecting crystalline defects and allowing a proper classification of a large variety of types of crystalline defects in substrates, such as silicon carbide.

It is also a purpose of the invention to improve the discrimination of crystalline defects with respect to other non-crystalline defects.

It is another purpose of the invention to provide a device and a method for the detection of crystalline defects in off-axis, monocrystalline substrates, allowing a high throughput and minimizing the measurement time.

It is another purpose of the invention to provide a device and a method for the detection of crystalline defects in off-axis, monocrystalline substrates, allowing a high versatility to be adapted to the detection of specific defects or classes of detects.

At least one of these aims is achieved by a device for detecting crystalline defects in an off-axis monocrystalline substrate, wherein the normal to the surface of the substrate is tilted with respect to the crystallographic growth axis by a tilt angle, the tilt angle being contained in a plane, called angle plane, perpendicular to the surface, the device comprising:

at least one detector, at least one illumination light source configured to illuminate the substrate with an illuminating light beam, the at least one illumination light source being arranged in at least one of a first position and a second position, at least one excitation light source configured to illuminate the substrate with an excitation light beam configured to produce an emission of photoluminescence light by the substrate, imaging means configured to image the substrate according to a field of view on the at least one detector, said at least one detector producing at least one image of the substrate, and processing means configured to detect crystalline defects using said at least one image of the substrate, wherein the at least one illumination light source and the imaging means are arranged in a dark-field configuration, and wherein in the first position, the at least one illumination light source is arranged such that the illuminating light beam is parallel or quasi-parallel to the angle plane, and in the second position, the at least one illumination light source is arranged such that the illuminating light beam is parallel or quasi-parallel to a plane, called perpendicular plane, containing the normal to the surface and being perpendicular to the angle plane.

The imaging means may comprise for instance optical lenses or objective. The processing means may comprise a computer, a microprocessor or a controller and the necessary hardware such as I/O boards and frame grabber to acquire and process images from the detector.

The detection device according to the present invention allows for an improved detection of crystalline defects in off-axis monocrystalline substrates.

In the device according to the invention, the substrate to be measured is illuminated according to at least two complementary illumination and detection schemes.

In a first scheme, the substrate is illuminated by at least one illuminating light beam oriented in a specific direction relative to the crystallographic growth axis, namely parallel or quasi-parallel to the angle plane, and/or parallel or quasi-parallel to a perpendicular plane containing the normal to the surface of the substrate and being perpendicular to the angle plane, respectively.

These two illumination arrangements and orientations allow for detecting almost any kind of crystalline defect. Indeed, most of the crystalline defects develop with the crystal growth, and generate patterns which extend mostly along the crystalline axis directions, in the direction parallel to the plane formed by the crystallographic axis and the normal to the wafer surface, or in the direction parallel to the perpendicular plane containing the normal to the surface of the substrate and being perpendicular to the angle plane.

According to the invention, the illumination is arranged parallel or quasi-parallel to at least one of these directions, in order to generate a strong response in terms of scattered light from defects extending substantially perpendicularly to the direction of illumination. For other illumination arrangements and orientations, as it has been observed, crystalline defects trigger very little, or at least much less response. On the other hand, non-crystalline defects don't have in the general case any privileged orientation and may trigger a more uniform response regardless of the orientation of the illumination. The discrimination of crystalline defects from other defects is thus improved.

The device of the invention is arranged in a dark-field configuration for that or these illumination light sources, which means that the specular reflection of the light on or in the substrate is not collected. So, in the arrangement of the device according to this first scheme, only the light scattered or diffracted by the substrate is collected. The image produced in that first scheme is a dark field or scattering image.

In addition, as the illumination is oriented in specific angular positions, the arrangement of the device according to this first scheme may be referred to as directional dark-field (DDF) arrangement.

In a second scheme, the substrate to be measured is subjected to an excitation light beam adapted to trigger photoluminescence (PL) light emission from the substrate. That photoluminescence (PL) light may for instance be generated by fluorescence. As crystalline defects frequently alter locally the photoluminescence or fluorescence properties of the substrate, the photoluminescence light also reveals crystalline defects. These defects may be the same as the defects revealed in the directional dark-field arrangement, or they may differ.

In this second scheme, a dark-field configuration can also be used so that the specular reflection of the excitation light on or in the substrate is not collected on the detector. In that case, only the light generated by photoluminescence is collected by the detector, to optimize the signal to noise ratio.

In this second scheme however, the dark field configuration is not mandatory, because the photoluminescence signal of interest is at wavelengths different from the wavelengths of the excitation light. So, a bright field configuration or any configuration in which some light from the excitation light source is reflected towards the detector may also be used. To avoid perturbing the photoluminescence detection, filters can be used in the detection as explained later to reject the excitation wavelength before it reaches the detector. But in practical cases, the excitation wavelength can be in the UV, at wavelengths which are not detected by the detector, if this one is a CCD or a CMOS based detector for instance. So, it cannot perturb the measurement.

The image produced in that second scheme is a photoluminescence (PL) image. And so, the arrangement of the device according to this second scheme may be referred to as photoluminescence (PL) detection arrangement.

The combination of these two illumination and detection schemes of the device according to the invention (the directional dark field and the photoluminescence) allows for a comprehensive characterization of crystalline defects in monocrystalline off-axis substrates, by allowing the detection of a large variety of detects. Indeed, certain defects require certain illumination schemes, or acquisition modes, or certain combinations of illumination schemes and acquisition modes, to be identified. The device according to the present invention thus allows a high versatility as it can adapted to the detection of various or specific defects or classes of detects.

In the first scheme, the dark-field configuration of the device according to the invention allows for primarily revealing surface defects that scatter the illumination light. If the illumination light penetrates the substrate, it may also be scattered by defects below the surface of the substrate.

Similarly, in the second scheme, the excitation light allows for primarily revealing by photoluminescence surface defects. If the illumination light penetrates the substrate, it may also reveal defects below the surface of the substrate.

So, if the area of interest is on or close to the surface of the substrate, the illumination and excitation light wavelengths may be chosen to have a limited depth of penetration into the substrate.

An off-axis substrate is a substrate, for instance a wafer, with a tilt angle, or off-angle, corresponding to the angle between the growth or stacking direction and the normal of the surface of the substrate, different from zero.

The tilt angle is introduced to ensure high-quality homoepitaxial growth on the surface of the substrate, such as a wafer, when growing additional layers on it. Additional epitaxial layers may be used to introduce various dopants, and/or to ensure layers with less crystalline defects than the substrate.

A substrate, as referred to herein, may comprise a bulk monocrystalline substrate, or a bulk monocrystalline substrate with one or several additional layers grown on it by epitaxy.

Examples of off-axis monocrystalline materials include silicon (Si) or silicon carbide (SiC), with for instance 6H—SiC and 4H—SiC polytypes.

According to an embodiment, in the first position, the at least one illumination light source may be arranged such that the illuminating light beam is parallel to a plane containing the normal to the surface of the substrate and forming an angle smaller than +/−10°, preferably smaller than +/−5°, more preferably smaller than +/−4°, with the angle plane.

The direction of the illuminating light beam may correspond for instance to an optical axis of the light emitted by the light source. The illumination light source is then arranged so that the direction of illumination is within a small angle from the plane formed by the normal to the substrate's surface and the crystallographic axis in the growth direction. In other words, the illuminating light beam is then parallel or quasi-parallel to the angle plane. Being quasi-parallel means that it deviates from the angle plane of a small angle, corresponding to +/−10°, or +/−5°, or +/−4°.

In the second position, the at least one illumination light source may be arranged such that the illuminating light beam is parallel to a plane containing the normal to the surface of the substrate and forming an angle smaller than +/−10°, preferably smaller than +/−5°, more preferably smaller than +/−4°, with the perpendicular plane.

The direction of the illuminating light beam may correspond for instance to an optical axis of the light emitted by the light source. The illumination light source is then arranged so that the direction of illumination is within a small angle from the perpendicular plane, i.e., the plane perpendicular to the plane containing the illumination direction of the light source in the first position. In other words, the illuminating light beam is then parallel or quasi-parallel to the perpendicular plane. Being quasi-parallel means for instance that it deviates from the perpendicular plane of a small angle, such as +/−10°, or +/−5°, or +/−4°.

The device according to the invention may comprise an illumination light source arranged sequentially in the first position and the second position.

According to some other embodiments, the device according to the invention may comprise a first illumination light source arranged in the first position and a second illumination light source arranged in the second position.

The combined use of a light source in the first and the second position can reveal most of the crystalline defects.

Advantageously, the device according to the invention may further comprise an illumination light source arranged in a third position different from the first and second positions and configured to illuminate the substrate with a supplemental illuminating light beam.

This supplemental illuminating light beam may be provided by an illumination light source arranged sequentially in at least one of the first and the second position, and in the third position. Alternatively, the supplemental illuminating light beam may be provided by a supplemental illumination light source arranged in the third position.

The acquisition of images of the substrate illuminated with at least one illumination light source arranged in the first and/or second position, and with an illumination light source arranged in a third position different from the first and/or second position, respectively, allows for a better discrimination of crystalline defects relative to other, non-crystalline defects. Indeed, the illumination from this third position triggers a very low response from the crystalline defects while the other, non-crystalline defects have response to illumination which is much less sensitive to the orientation of the illumination. By comparing images acquired with an illumination in the first and/or second position, and with an illumination in the third position, respectively, a discrimination or a rejection of the non-crystalline defects can be conveniently realized.

The discrimination of the crystalline with respect to the other non-crystalline defects is thus improved.

Non-crystalline defects comprise, for example, particles contaminating the surface of the substrate, or scratches or pits due to external causes non-related to the crystalline growth (abrasion, etc.).

It is to be noted that without an illumination light source arranged in the third position, the defects as detected by the invention can be of crystalline or non-crystalline origin. However, thanks to the invention, crystalline defects provide a particularly strong response among other defects which improve their detection. In addition, by contrast with non-crystalline defects, many crystalline defects have a response to illumination which is very different for an illumination in the first and the second position, respectively. So, by comparing the information obtained with the illumination light source arranged in the first and the second position, many crystalline defects can be identified and discriminated from non-crystalline defects. But of course, an illumination in a third position improves the discrimination between crystalline and non-crystalline defects.

In the third position, the illumination light source may be arranged such that the illuminating light beam is parallel to a plane containing the normal to the surface of the substrate and forming an angle larger than +/−5°, preferably larger than +/−10° with the angle plane and with the perpendicular plane, respectively.

The device may be arranged to provide one or a plurality of supplemental illuminating light beam(s) having one or a plurality of orientations with respect to the angle plane and the perpendicular plane, respectively, each being parallel to a plane containing the normal to the surface of the substrate and forming an angle larger than +/−5° (or larger than 5° in absolute value), preferably larger than +/−10° (or larger than 10° in absolute value) with the angle plane and with the perpendicular plane, respectively.

The at least one excitation light source, which is used for generating photoluminescence, may be placed at any angular position with respect to the angle plane or being parallel to any plane containing the normal to the surface of the substrate. It or they may be positioned at one angular position or arranged in such a way to cover a broad range of angular positions, to allow for a better homogeneity of the illumination of the surface of the substrate.

The at least one illumination light source may be arranged such that a direction of the illuminating light beam and/or the excitation light beam, respectively, is within an angle of 20°-89°, or preferably 30°-85°, or even more preferably 55°-80°, to the normal of the surface of the substrate.

These directions of illumination are chosen to ensure that the dark field condition is fulfilled. Furthermore, using illumination with large incidence angles with respect to the normal to the surface improve the selectivity of the detection of the crystalline defects which is provided in the invention, in the directional dark field detection scheme, by the illumination positioned in specific angular positions, previously defined as the first and the second position. That selectivity is provided by the fact that the crystalline defects have a strong response to the illumination only for an illuminating beam whose angular orientation is in a narrow angular range around the angle plane and the perpendicular plane. Because of the scattering patterns generated by the defects, it can be shown that that selectivity increases with the angle of incidence of the illuminating beam with respect to the normal to the surface of the substrate. For instance, with a collimated illuminating beam (having only one angular direction of incidence), it can be shown that the angle of incidence of the illuminating beam with respect to the normal to the surface shall be larger than 30° to provide that crystalline defects have a significant response only for angles of incidence within 10° of the angle plane or the perpendicular plane, and larger than 55° to have a significant response only within +/−4° of these planes.

According to an embodiment, the at least one excitation light source may be arranged in a dark field configuration. It may further be arranged such that a direction of the excitation light beam is within an angle of 20°-80° to the normal of the surface of the substrate.

According to another embodiment, the at least one excitation light source may be arranged in a bright field configuration, such that the specular reflection of the excitation light beam on the substrate is reflected at least partially in the direction of the detector. It may further be arranged so that the optical axis of the excitation light beam is parallel to an optical axis of the imaging means.

According to an embodiment, the at least one excitation light source may be arranged to emit selectively excitation light beam(s) at different excitation wavelengths.

Different excitation wavelengths allow for a higher versatility of the device. For instance, shorter wavelengths have a smaller depth of penetration than longer wavelengths, thereby limiting the detection zone for defects to a limited thickness. For example, a penetration depth of few tens of microns corresponds to the thickness of an epitaxial layer on the substrate. The different excitation wavelengths may also generate different photoluminescence responses from the substrate and the crystalline defects, thereby allowing a better detection and discrimination of crystalline defects.

The different excitation wavelengths can be used sequentially, or one at a time. The excitation light source may comprise a plurality of excitation light sources emitting at one of a plurality of selected wavelength ranges. Alternatively, broadband light sources may be used, with filters to select the excitation wavelength ranges.

The device according to the invention may further comprise optical filter means arranged between the substrate and at last one of the detectors and configured to filter the light issued from the substrate according to one or more defined spectral bands.

A filter holder may be provided, the filter holder being configured to position selectively a plurality of spectral filters between the substrate and at least one of the detectors.

These filters can be used to filter the photoluminescence light. They can notably be used to detect the photoluminescence light in one or several selected spectral ranges.

According to an embodiment, the device according to the invention may comprise at least two detectors, and at least one filter or dichroic filter configured to pass the light in different spectral bands to the respective detectors.

The presence of at least two detectors allows for improving the throughput of the device of the invention as two or more images may be acquired simultaneously.

According to another aspect of the invention, it is proposed a method for detecting crystalline defects in an off-axis monocrystalline substrate, wherein the normal to the surface of the substrate is tilted with respect to the crystallographic growth axis by a tilt angle, the tilt angle being contained in a plane, called angle plane, perpendicular to the surface of the substrate, the method being implemented with a device comprising at least one detector, at least one illumination light source, at least one excitation light source, imaging means, and processing means, the at least one illumination light source and the imaging means being arranged in a dark-field configuration, the method comprising:

illuminating, with the at least one illumination light source, the substrate with an illuminating light beam, the at least one illumination light source being arranged in at least one of a first position and a second position;

illuminating, with the at least one excitation light source, the substrate with an excitation light beam configured to produce an emission of photoluminescence light by the substrate, imaging, with the imaging means, the substrate according to a field of view on the at least one detector;

producing with said at least one detector at least one image of the substrate; and detecting, with the processing means, crystalline defects using said at least one image of the substrate;

wherein in the first position, the at least one illumination light source is arranged such that the illuminating light beam is parallel or quasi-parallel to the angle plane, and in the second position, the at least one illumination light source is arranged such that the illuminating light beam is parallel or quasi-parallel to a plane, called perpendicular plane, containing the normal to the surface and being perpendicular to the angle plane.

According to some embodiments corresponding to directional dark field detection schemes, the method may comprise at least one of the following steps:

illuminating the substrate with an illumination light source arranged in the first position, and producing an image of the substrate;

illuminating the substrate with an illumination light source arranged in the second position, and producing an image of the substrate;

simultaneously illuminating the substrate with a first and a second illumination light source respectively arranged in the first and the second position, and producing an image of the substrate.

Thus, a separate image may be acquired when using illumination light source(s) in the first and the second position, respectively.

Separate acquisitions allow for a better discrimination of the different types of crystalline defects.

Alternatively, an image may be acquired when using both first and second illumination light sources in the first and the second position simultaneously.

According to an embodiment, the method according to the invention may further comprise illuminating the substrate with an illumination light source arranged in a third position different from the first and second positions, and producing a supplemental image of the substrate.

According to an embodiment corresponding to the photoluminescence detection scheme, the method according to the invention may comprise illuminating the substrate with at least one excitation light source and producing an image of the substrate with the photoluminescence light emitted by said substrate.

According to an embodiment, the method may further comprise spectrally filtering the photoluminescence light, and producing one or several images of the substrate with the photoluminescence light in selected spectral ranges.

Photoluminescence images in different spectral ranges of interest may thus be acquired, allowing for obtaining complementary information.

Advantageously, the method may comprise sequentially illuminating the substrate with one or several excitation light beams having different excitation wavelengths, and producing photoluminescence images of the substrate with the photoluminescence light generated at the respective excitation wavelengths.

The substrate may be illuminated simultaneously with at least one illumination light source and at least one excitation light source, and an image of the substrate illuminated this way may be produced.

In the directional dark field detection scheme, the method may further comprise discriminating crystalline defects from non-crystalline defects by comparing defects detected in the supplemental image and defects detected in at least one image obtained with at least one illumination light source arranged in at least one of the first and the second position and with the at least one excitation light source.

In that case, two or three images can be acquired sequentially, with respectively illumination light source(s) in the first and/or the second position, in the third position, and with the excitation light source.

The acquired images may be compared to discriminate the crystalline defects, which are mostly present on the images acquired with the first and/or the second light sources and the excitation light source, while the other, non-crystalline defects are present on all images.

Alternatively, the comparison can be realized by comparing defects identified separately on the respective images.

So, crystalline defects can be detected in the DDF detection scheme by using images obtained with illumination in the first, second, and third position.

In the PL detection scheme, depending on the wavelength of the excitation light sources and the spectral ranges used for acquiring the PL images, crystalline defects exhibit various signatures. So, by acquiring PL images with various set of excitation wavelengths and various spectral ranges or filters for the detection, various crystalline defects can be detected, in one PL image acquired with a set of parameters, or by combining information of several PL images acquired with several sets of parameters.

And of course, the information of images obtained with the DDF detection scheme and with the PL detection scheme can be combined to refine further the detection and the classification of the crystalline defects.

BRIEF DESCRIPTION OF THE DRAWINGS

Other advantages and characteristics will become apparent on examination of the detailed description of an embodiment which is in no way limitative, and the attached figures, where.

DETAILED DESCRIPTION

It is well understood that the embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the invention with respect to the prior art.

In the following FIGURES, elements common to several figures may keep the same reference sign.

The embodiments described below relate to devices and methods for detecting crystalline defects in off-axis monocrystalline substrates. As previously mentioned, such substrates present a tilt angle, or off-angle, larger than zero between the crystallographic growth direction and the normal to the surface of the substrate.

Figure 1:
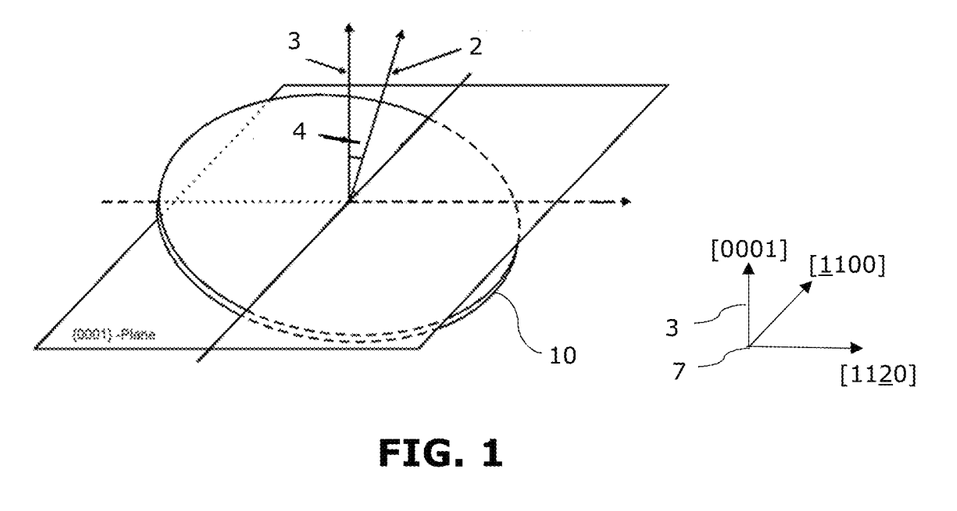
FIG. 1 shows an example of a crystalline wafer of 4H—SiC with the different axes and the tilt angle referred to in the present document.

FIG. 1 illustrates a monocrystalline off-axis wafer 10 of silicon carbide (SiC), of 4H—SiC polytype, with the different crystallographic directions or axes 7 and the tilt angle 4 referred to herein. The wafer 10 is made from a SiC boule grown on the [0001] face 6, corresponding to the crystallographic [0001] C-axis 3 according to the Miller Indices notation. As described for instance in the SEMI M55-0921 standard, the wafer is then extracted, for instance by slicing, from the SiC boule with an orientation such that the normal 2 to its surface forms with the crystallographic C-axis 3 a tilt angle 4, also called off-angle 4. According to the SEMI M55-0921 standard, the normal 2 is tilted, with respect to the [0001] axis 3, toward the [11$\bar{2}$0] direction. The off-axis angle is typically 4° toward the [1$\bar{1}$20] axis.

The plane containing the tilt angle is called angle plane, or tilt angle plane, in the present document. In the example illustrated in FIG. 1, the angle plane is the plane containing the [0001] and [11$\bar{2}$0] axes. It contains also the normal 2 to the surface.

Typically, crystalline defects in such monocrystalline wafers, with or without epitaxial layer, develop in the direction of growth, or at least in directions related to the direction of growth. They result in dislocations or discontinuities of the crystalline structure extending mostly in directions corresponding to orientations of crystalline axes. In the case of a 4H—SiC off-axis wafer as illustrated in FIG. 1, these defects extend mostly along the [0001], [11$\bar{2}$0] and [$\bar{1}$100] axis.

A defect present in the substrate, such as a basal plane dislocation (BPD), a threading edge dislocation (TED), or a threading screw dislocation (TSD), may be converted into a different type of defect when crossing the interface between the substrate and an epitaxial layer, but the orientation of the defect both before and after the conversion stays related to the direction of the crystal growth.

Figure 2A:
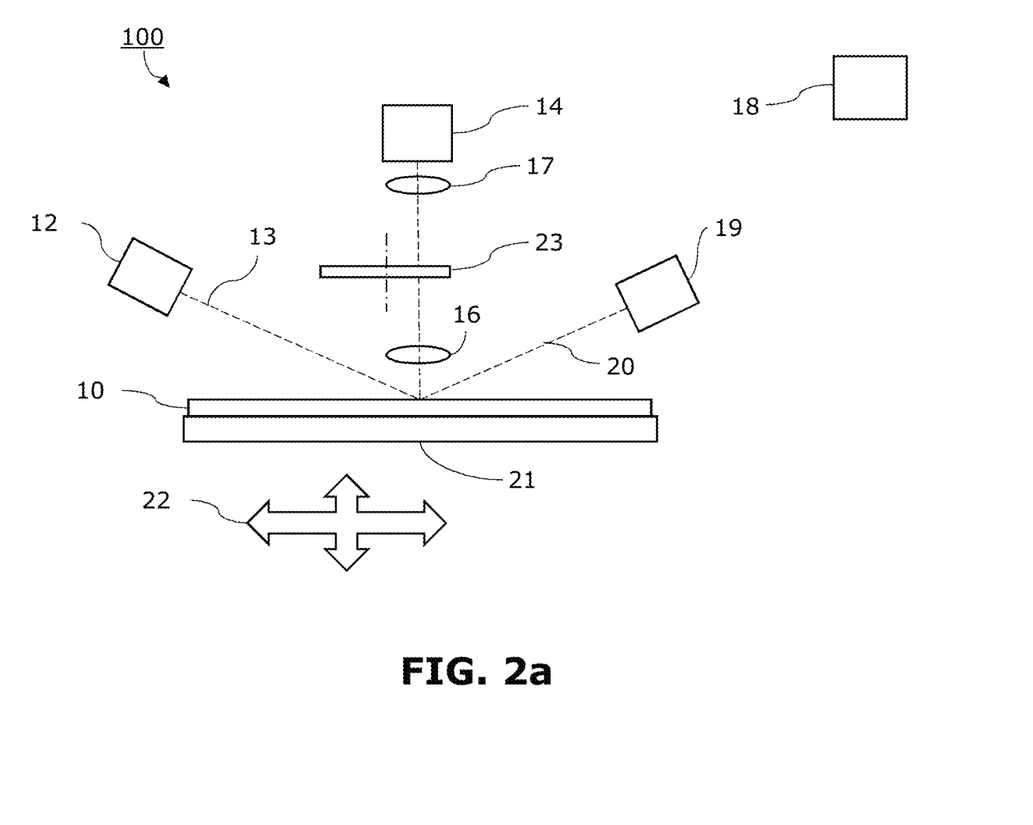
FIGS. 2a, 2b, 2c are diagrammatic representations of a detection device according to non-limitative embodiments of the present invention.

FIG. 2a is a diagrammatic representation of a non-limitative example of a detection device according to the present invention.

The device 100, represented in FIG. 2a, may be used to detect crystalline and non-crystalline defects in semiconductor substrates, such as SiC or Si wafers with or without additional epitaxial layer(s).

The device 100 is based on an optical dark-field detection scheme.

The device 100 comprises an illumination light source 12 for illuminating a substrate 10 with an illumination light beam 13. More than one illumination light source may be used to illuminate the substrate 10. That or these illumination light sources 12 are used in the directional dark field (DDF) detection scheme of the invention.

The device 100 also comprises an excitation light source 19 for illuminating the substrate 10 with an excitation light beam 20. The wavelength of the excitation light source 19 is chosen to trigger the emission of photoluminescence light by the substrate 10. The light from the excitation light source(s) is preferably condensed around the field of view in order to match that field of view as much as possible.

The device 100 further comprises a holder such as a wafer chuck 21 to hold the substrate 10. The device 100 also comprises positioning means 22 such as translation and/or rotary stages to position the substrate 10, in translation and/or in rotation, relative to the imaging means.

The device 100 also comprises a detector 14. The detector 14 may be, for example, a matrix camera such as a CCD or CMOS camera. Of course, other types of detectors can be used, such as line or point detectors associated with a scanning system.

The device 100 comprises imaging means, or an optical imaging arrangement, configured to image the substrate 10, or a part of it, according to a field of view on the detector 14. In the represented embodiment, the imaging means comprise an objective lens 16, or an objective, and a detector lens 17, or a tube lens, and other optical components such as filters, or apertures.

The imaged field of view may cover the full surface of the substrate 10 or a part of it. In the latter case, the field of view may be positioned at different locations over the surface of the substrate, for instance to obtain an image of the whole substrate by stitching a plurality of fields of view. This scanning may be for example done by moving the substrate 10 with the positioning means 22.

The detector 14 then produces images of the substrate 10, for example of its surface or of any other plane within the substrate 10. These images can be DDF images or PL images, depending on the illumination or the excitation light source used.

The device 100 also comprises processing means 18 for processing the acquired images, and in particular for detecting crystalline defects from the images.

The processing means 18 may comprise, in a non-limitative way, a computer, a microprocessor, a controller board, and all the hardware necessary, such as volatile and non-memory memory, analogic to digital converters, and I/O boards, to perform crystalline defects detection and identification according to the invention.

The illumination light source(s) 12 and the imaging means 16, 17 are disposed in a dark-field configuration, which means that the specular reflection of the light issued from the illumination light source 12 on or in the substrate 10 is not collected by the imaging means 16, 17 and does not reach the detector 14. Only the light scattered or diffracted by the substrate is collected and reach the detector 14.

In the embodiment illustrated, the excitation light source (s) 19 and the imaging means 16, 17 are also disposed in a dark-field configuration, so that only the photoluminescence light is collected and reaches the detector 14.

For the DDF detection scheme, preferably, the illumination light wavelength is chosen to have a limited depth of penetration into the substrate to provide a more localized information. For instance, the wavelength may be chosen to be:

a wavelength corresponding to an energy smaller than the bandgap of the substrate material, for example 310 nm for 4H—SiC;

a wavelength which is well absorbed by a dopant present in the material, for example 460 nm for n-type 4H—SiC or 620 nm for n-type 6H—SiC. Such wavelengths are also easier to detect by common cameras.

For the PL detection scheme, the wavelength of the excitation light source(s) shall correspond(s) to a photon energy larger than the bandgap of the material of the measured substrate.

For instance, in the case of a 4H—SiC wafer, wavelengths such as 275 nm, 310 nm, and 365 nm may be used.

The choice of the wavelength depends on the application of the detection device. For instance, shorter wavelengths have the advantage of having a small depth of penetration, thereby limiting the detection zone for defects to a few tens of microns, corresponding for instance to the thickness of an epitaxial layer.

The at least one excitation light source may comprise a plurality of excitation sources, wherein each of these sources has a different wavelength. The excitation light source may comprise, for example, a plurality of light-emitting diodes (LED) emitting at different wavelengths, with either several illumination modules, each one having LEDs of a single wavelength, or with at least one illumination module, having LEDs of several wavelength. The modules and/or LEDs may be switchable such as to be used sequentially, one wavelength at a time.

Examples of wavelengths to be used with SiC substrates are 275 nm, 310 nm, and 365 nm.

The device 100 of the invention further comprises a filter holder 23 to hold and position optical filters between the substrate 10 and the detector 14. The filter holder 23 may comprise a filter wheel, as shown on FIG. 2a, or a filter slider, or other means adapted to hold and position one or more different filters.

The filters allow notably for detecting photoluminescence light in selected spectral bands. For example, for SiC, such filters may include band-pass filters around 390 nm, 400 nm, 450 nm, 500 nm, and/or 550 nm, and/or long-pass filters above 650 nm, 750 nm, and/or 850 nm.

The filter holder 23 may comprise an empty slot or position to allow measurements without a filter, for instance for DDF measurements, and for photoluminescence measurements when the whole photoluminescence spectrum is to be detected. The filter holder 23 may further comprise one or more filters adapted to select specific spectral ranges for PL analysis or to reject the excitation wavelength if needed.

According to the invention, the illumination light source(s) 12 used for the DDF detection scheme are placed or arranged in very specific angular positions with respect to the substrate 10.

Figure 3A:
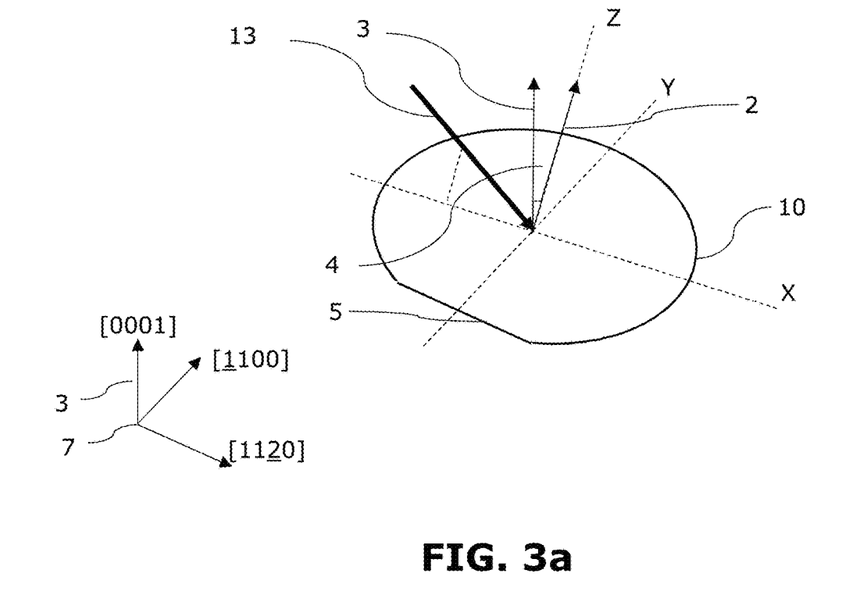
FIGS. 3a, 3b, 3c illustrate respectively an illumination configuration in the detection device according to a non-limitative embodiment of the present invention.

FIG. 3*a* illustrates the illumination configuration for an illumination light source 12 positioned in a first position.

In the first position, the illuminating light beam 13 from the light source is set parallel (for instance within +/−4°) to the angle plane, i.e., the plane containing the normal 2 to the wafer surface and the crystallographic axis 3 in the growth direction, and thus the tilt angle 4 formed by the normal 2 to the wafer surface and the crystallographic axis 3 in the growth direction.

As illustrated in FIG. 3*a*, using a reference system with axes X, Y, Z as illustrated, the surface of the substrate 10 is contained in an X-Y plane. The normal 2 to the wafer surface is oriented along a Z direction and the crystallographic axis 3 in the growth direction is contained in the X-Z plane. The direction of illumination is thus also contained in the X-Z plane.

As an example, in the case of a SiC wafer, and more particularly a 4H—SiC wafer, the crystallographic axis in the growth direction 3 corresponds to the C-axis [0001]. The direction of illumination for the first position is then parallel or quasi-parallel to the plane containing the normal 2 to the wafer surface and the [11$\bar{2}$0] crystallographic axis.

As already explained, wafers for the manufacturing of electronic components are fabricated according to well-established standards and their crystalline axis have also well-defined orientations with respect to positioning flats or notches. For example, according to some configurations widely used in the industry, a 4H—SiC wafer manufactured according to the SEMI M55-0921 standard has an orientation flat 5 parallel to the [11$\bar{2}$0] axis, as illustrated in FIG. 3*a*. In that case, the direction of illumination in the first position shall be in a plane parallel or quasi-parallel to that flat 5.

Thanks to these standardized configurations, the positioning of the light source in the first position may thus be realized easily, for instance by positioning angularly the wafer in the correct orientation on the chuck 20 using a pre-positioner and the flat 5, or by using positioning means 22 with a rotary stage. Alternatively, or in addition, the light source can be angularly positioned with respect to the wafer.

The illumination from the illumination light source in the first position allows for detecting mostly crystalline defects that extend, for 4H—SiC, in the growth direction [0001] of the substrate and along the [1$\bar{1}$00] axis.

Figure 3B:
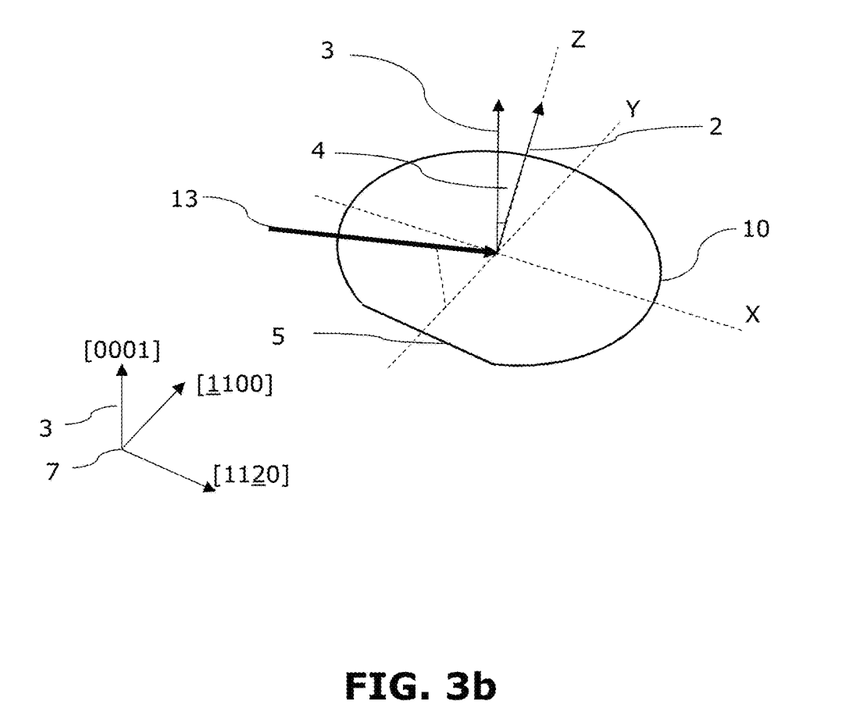

FIG. 3*b* illustrates the illumination configuration for an illumination light source 12 positioned in a second position.

In the second position, the illumination light beam 13 from the illumination light source is set parallel (for instance within +/−4°) to the perpendicular plane, i.e. the plane containing the normal 2 to the surface of the substrate and being perpendicular to the angle plane.

The illumination direction of the light source in the second position, or at least its projection in the X-Y plane, is thus perpendicular or quasi-perpendicular to the illumination direction of the light source in the first position, or at least its projection in the X-Y plane. It is contained in the Y-Z plane.

As an example, in the case of a 4H—SiC wafer, the direction of illumination for the second position is then parallel or quasi-parallel to the plane containing the normal 2 to the wafer surface and the [1$\bar{1}$00] crystallographic axis.

The illumination from the illumination light source in the second position allows for detecting mostly crystalline defects that extend, for 4H—SiC, in the growth direction [0001] of the substrate and along the [11$\bar{2}$0] axis.

According to some embodiments, the device 100 may have one illumination light source 12 arranged in one of a first position and a second position, to measure from one of these positions only.

According to some embodiments, the device 100 may have also a same illumination light source 12 arranged to be used sequentially in the first and the second position. In that case, the wafer can be rotated, for instance using a rotary stage of the positioning means 22, or an external wafer positioner. The illumination light source 12 can also be placed on a rotating element allowing to position it in the first and the second position, respectively.

According to some other embodiments, the device 100 may comprise two illumination light sources. One of the light sources is then arranged in the first position and the other light source is arranged in the second position. The light sources may then illuminate the substrate simultaneously or alternatively.

Figure 3C:
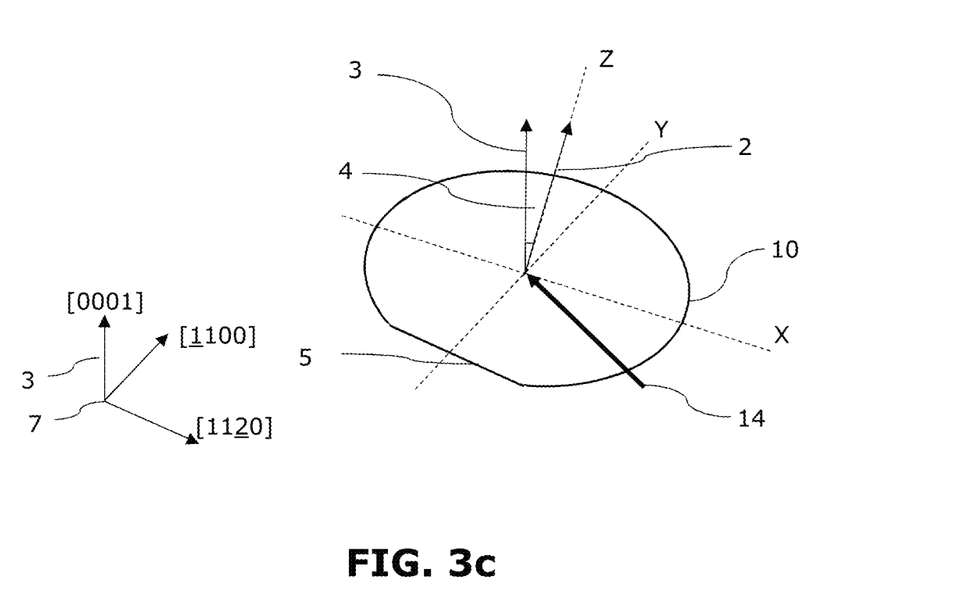

In an embodiment illustrated in FIG. 3*c*, the device according to the invention further comprises an illumination light source 12 arranged in a third position different from the first and second positions. This illumination light source is configured to illuminate the substrate with a supplemental illuminating light beam 14.

The third position corresponds to a position of the illumination light source such that the supplemental illuminating light beam 14 is parallel to a plane containing the normal to the surface and whose angular orientation in the X-Y plane is different from the angle plane and the perpendicular plane defined previously. In particular, the supplemental illuminating light beam may be parallel to a plane forming an angle larger than +/−10° with the angle plane and with the perpendicular plane, respectively.

As previously, the supplemental illuminating light beam may be generated with a same illumination light source as for the first and for the second position, by positioning angularly the light source in various positions. Alternatively, a supplemental light source may be specifically positioned at the third position. In both embodiments, a single or a plurality of third positions may be used.

The illumination with the supplemental illuminating light beam allows for imaging and detecting non-crystalline defects and discriminate them from crystalline defects. Indeed, as the orientation of the illumination in the third position is significantly different from the orientation of the crystalline axis, the crystalline defects generate weaker responses in the images acquired with that configuration. So, while crystalline defects may only or mostly be detected from images acquired with the illumination in the first and/or second position, non-crystalline defects are present in images acquired with illumination in any of the first, second, or third light position.

In FIGS. 3*a*, 3*b*, and 3*c*, to ensure a proper angular selectivity of the response of the crystalline defects in the DDF detection scheme, angular orientation of the illuminating beam relative to the Z axis, i.e., the normal of the substrate's surface, is set at 55°.

For the PL detection scheme, the angular position of the excitation light source(s) with respect to the crystalline axis of the substrate may be chosen arbitrarily. And for the angle of incidence with respect to the normal to the surface, it is adjusted, in the embodiment illustrated, so that the specular reflection is not transmitted to the detector (dark-field arrangement).

For example, the excitation light source(s) may be placed around the substrate at positions left available by the illumination light source(s).

The direction of illumination from the excitation light source(s) can be within 20° to 80° from the Z axis.

Figure 2B:
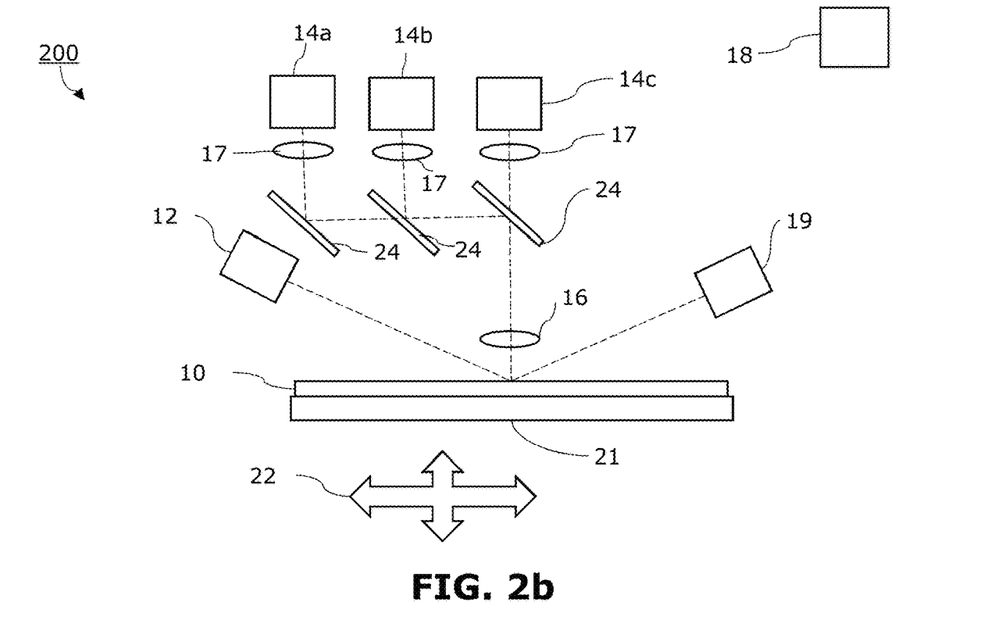

FIG. 2b is a diagrammatic representation of another non-limitative example of a detection device according to the present invention.

The device 200, represented in FIG. 2b, comprises all the elements of the device 100 of the embodiment represented in FIG. 2a. The device 200 of FIG. 2b differs from the device 100 of FIG. 2a in that instead of a filter wheel, the device 200 comprises a combination of dichroic beam splitters 24 and a plurality of detectors 14a, 14b, 14c. The dichroic beam splitters allow separating the light issued from the substrate 10 in the DDF and PL detection schemes in various spectral bands, and direct them to different cameras 14a, 14b, 14c. So, parallel acquisitions of these spectral bands can be achieved.

Figure 2C:
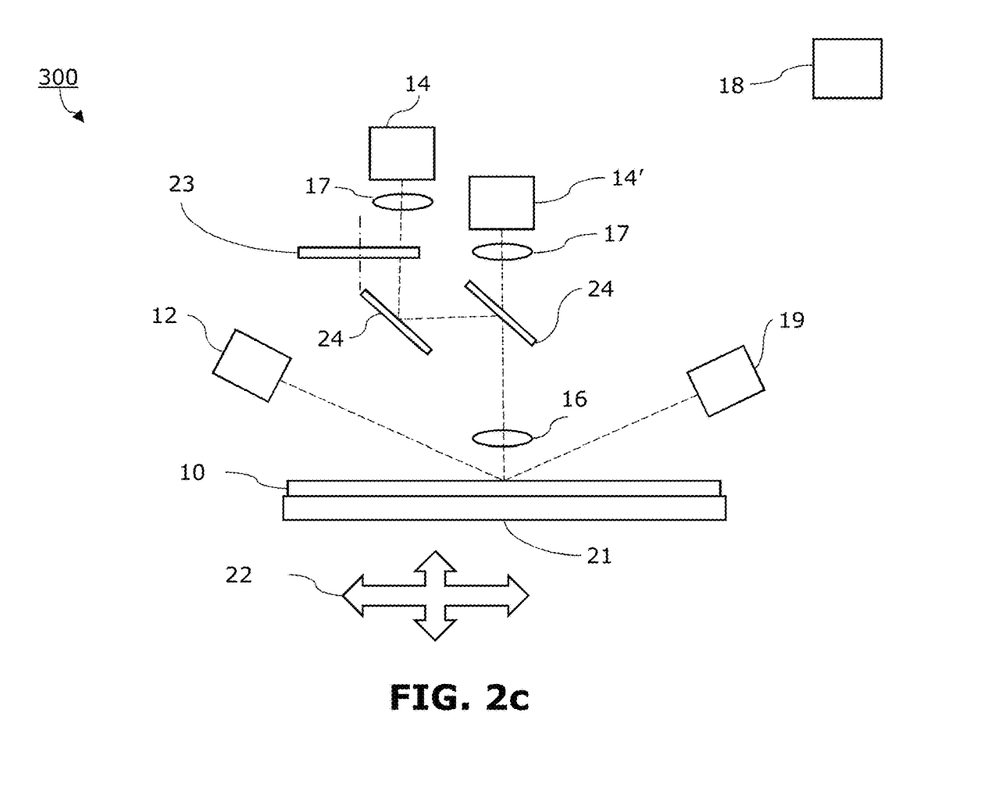

FIG. 2c is a diagrammatic representation of another non-limitative example of a detection device according to the present invention.

The device 300, represented in FIG. 2c, comprises all the elements of the device 100 of the embodiment represented in FIG. 2a. The device 300 of FIG. 2c further comprises a second detector 14' and beam splitters 24, dichroic or achromatic. The light issued from the substrate 10 is split by the beam splitter 24 towards the detectors 14, 14'. In the example illustrated, the beam splitters 24 are achromatic. One of the detectors 14' directly detects the light issued from the substrate 10, in its whole (useful) spectral range as needed for directional dark-field and photoluminescence light detection over the whole spectrum. The other detector 14, which is preceded by a filter wheel 23 as presented with reference to FIG. 2a, allows for the detection of specific spectral bands of the photoluminescence light.

The device according to the embodiments represented in FIGS. 2a, 2b, 2c may be implemented in order to detect crystalline defects in substrates. The device may in particular be implemented in a method for detecting crystalline defects according to the invention.

Figure 4:
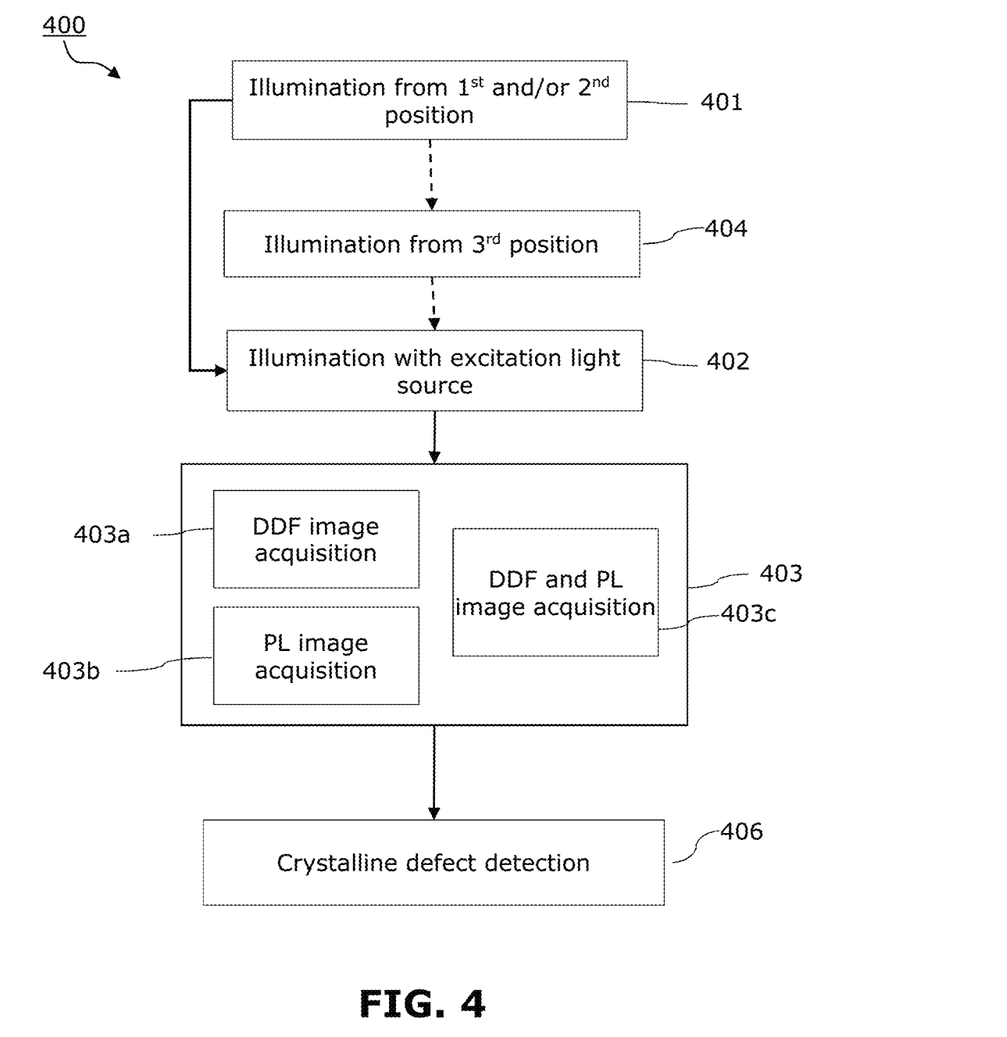
FIG. 4 illustrates a method for detecting crystalline defects in substrates according to a non-limitative embodiment of the present invention.

FIG. 4 illustrates a method for detecting crystalline defects in substrates according to an embodiment of the present invention.

The method 400 comprises an illumination step 401 from the first and/or the second position. A substrate is illuminated using an illumination light source positioned in the first position or in the second position.

The first and second positions correspond to the positions as previously described with reference to the device of the invention. In the first position, an illuminating light beam from the light source is contained in a plane being parallel or quasi-parallel to the tilt angle plane as previously defined, and in the second position, an illumination light beam from the illumination light source is contained in a plane containing the normal to the surface of the substrate and being perpendicular or quasi-perpendicular to the tilt angle plane.

Alternatively, in the illumination step 401, the substrate can be illuminated using two illumination light sources, of which the first one is positioned in the first position and the second one is positioned in the second position. In this case, the substrate can be illuminated simultaneously, or sequentially, by the first and the second illumination light sources.

The substrate can also be illuminated sequentially by an illumination light source positioned sequentially in the first and the second position.

The method 400 according to the embodiment as represented in FIG. 4 may further comprise an optional supplemental illumination step 404. In this step 404, the substrate is illuminated with an illumination light source positioned in at least one third position.

This or these third position(s) correspond(s) to the position(s) as described previously with reference to the device of the invention. In a third position, the substrate is illuminated with a supplemental illuminating light beam contained in a plane between the angle plane and the perpendicular plane.

The method 400 according to the invention comprises a further illumination step 402, wherein the substrate is illuminated by means of at least one excitation light source. The excitation light beam(s) from the excitation light source(s) are configured to produce an emission of photoluminescence light by the substrate.

The method 400 according to the invention comprises an image acquisition phase 403. In a first variant, the image acquisition phase 403 comprises a directional dark-field (DDF) image acquisition step 403a and a photoluminescence (PL) image acquisition step 403b. In a second variant, the image acquisition phase 403 comprises a combined DDF and PL image acquisition step 403c.

In the DDF image acquisition step 403a, the PL image acquisition step 403b and the combined DDF and PL image acquisition step 403c, one or several images of the substrate 10 are acquired, according to a field of view. The substrate 10 is imaged on a detector using the imaging means 16, 17, such as an objective lens or an objective and a detector lens. One or more images are then produced on the detector, according to the field of view of the imaging means.

In the image acquisition step 403a, an image may be acquired for each illumination configuration as described in step 401.

In particular, an image is acquired when the substrate is illuminated with an illumination light source arranged in the first or the second position, respectively.

Similarly, an image is acquired when the substrate is illuminated simultaneously by illumination light sources arranged respectively in the first and the second position.

Alternatively, two or more images are acquired sequentially when the substrate is illuminated sequentially by illumination light source(s) in the first and the second position.

If a supplemental illumination step 404 has been done, a supplemental image of the substrate, illuminated by a light source at a third position, is acquired. Several images may be acquired for several respective third positions.

In the PL image acquisition step 403b, one or several images of the substrate 10 are acquired of the substrate with the photoluminescence light emitted by the substrate.

According to an embodiment, the substrate is illuminated by an excitation light source at an excitation wavelength.

According to another embodiment, the substrate is illuminated sequentially with a plurality of excitation light sources having different wavelengths, such as described with respect to embodiments of the device according to the invention, and images of the substrate are produced for the respective wavelengths.

Independently of the excitation wavelength, the photoluminescence light issuing form the substrate may be spectrally filtered, such that one or several images may be acquired in selected spectral ranges.

According to an embodiment of the invention, one or more images may be acquired based on the directional dark-field illumination from a light source positioned in the first and/or the second position, without illumination from the excitation light source(s) (step 403*a*). Then, one or more further images may be acquired from the substrate when illuminated with the excitation light source(s) only, wherein one or more filters may be used or not (step 403*b*).

In this case, the directional dark-field measurements and the photoluminescence measurements are provided sequentially, in the form of two images or two sets of images.

As an example, the following measurement sequence may be used:
  directional dark-field image acquisition with one illumination light source and no filter,
  photoluminescence image acquisition with one excitation wavelength (for example, 310 nm) and no filter,
  photoluminescence image acquisition with the same excitation wavelength and a long-pass filter with 650 nm cut-off wavelength.

According to another embodiment, one or more images of the substrate may be acquired when illuminated simultaneously by illumination light source(s) positioned in the first and/or the second position, and by the excitation light source(s) (step 403*c*).

In this case, the directional dark-field measurements and the photoluminescence measurements are provided simultaneously, in the form of a single image or a single set of images. This image or these images therefore comprise(s) a mixture of a photoluminescence signal and a directional dark-field. This composite signal also constitutes a signature of the defects present in the substrate.

The method 400 according to the invention further comprises a detection step 406. Crystalline defects are detected by processing the acquired images of the substrate.

Crystalline defects can be detected by processing the acquired images of the substrate separately, using any known technique for image processing and classification, such as thresholding, segmentation, pattern detection, blob analysis, etc. . . . Alternatively of in addition, taking advantage of the high versatility of the device of the invention, for a better detection and classification of the defects, the information from images obtained with various configurations may be combined to detect characteristic defects signatures.

In addition, the method of the invention allows an efficient discrimination of crystalline defects from non-crystalline defects, even for non-crystalline defects that generate photoluminescence. That can be achieved in the DDF detection scheme, by using supplemental images acquired as described in relation with steps 404 and 403*a*, and by comparing defects detected in the supplemental image(s) and defects detected in image(s) acquired with the illumination light source arranged in the first and/or in the second position.

For example, the non-crystalline defects can be detected in the supplemental images. In these images indeed, most of the crystalline defects have a very low contrast. Then the images obtained with the illumination in the first and/or second position are processed. These images contain crystalline defects and non-crystalline defects. By using the information from the supplemental images, the non-crystalline defects are identified and removed to retain only the crystalline defects or separated to classify the defects in crystalline and non-crystalline categories.

Similarly, By using the information from the supplemental images, the non-crystalline defects can be identified and removed from the PL images, to retain only the crystalline defects, or separated to classify the defects in crystalline and non-crystalline categories.

Of course, several implementations are possible. The defects can be segmented and identified in all images before being categorized and analysed.

Alternatively, non-crystalline defect signatures can be located in the supplemental images, for instance by analysing local intensity variations, and these locations can be removed from the later detection steps when processing the images acquired with the illumination light source arranged in the first and/or in the second position for DDF, or with the excitation light source for PL, to detect crystalline defects.

It is also possible to combine, for instance by subtraction, the images, to remove the content of the supplemental images from the content of the images with the crystalline defects.

Of course, non-crystalline defects can be identified and rejected to retain crystalline defects, or crystalline defects can be identified and rejected to retain non-crystalline defects, or both type of defects can be separated and processed.

FIGS. 5 to 8 show examples of measurements carried out with the directional dark-field configuration, without illumination with an excitation light source. Crystalline defects appear as contrasted patterns on a background, having for many of them characteristic shapes. So, the detection step 403 may comprise any known technique for image processing and classification, such as thresholding, segmentation, pattern detection, blob analysis, etc.

Figure 5:
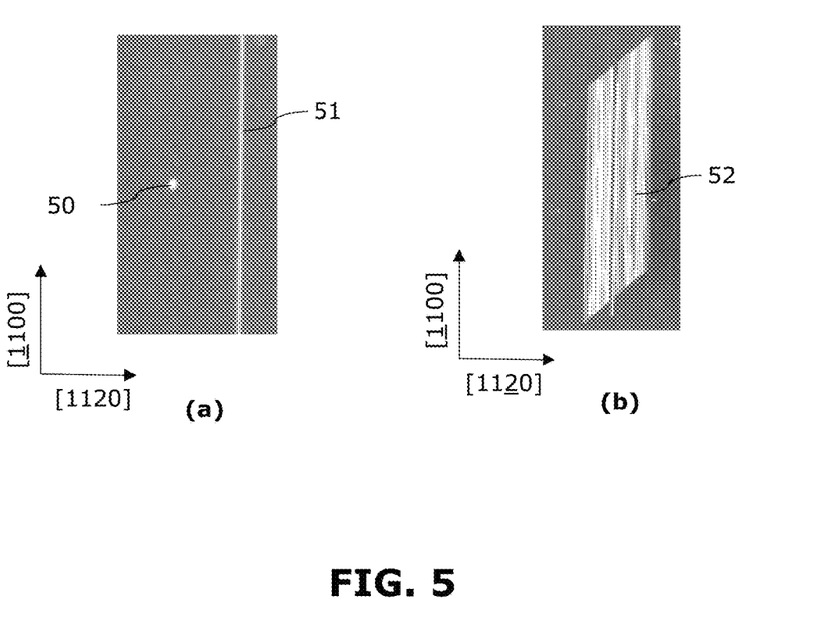
FIGS. 5a, 5b illustrate examples of measurements realized on a 4H—SiC wafer with an epitaxial layer, in directional dark field with an illumination light source in the first position.

FIG. 5 illustrates examples of crystalline defects detected in a 4H—SiC wafer with an epitaxial layer. In these examples, the substrate 10 is illuminated with an illumination light source in the first position.

FIG. 5(*a*) shows a "micropipe" 50, or TSD, already present in the base substrate layer and an associated stacking fault 51, resulting from the presence of the TSD, in the epitaxial layer.

FIG. 5(*b*) shows a step-bunching defect 52. Such defect may appear in the epitaxial layer when grown on a base substrate with a surface quality issue. It is due to an uneven formation of crystalline planes in presence of the tilt angle.

Figure 6:
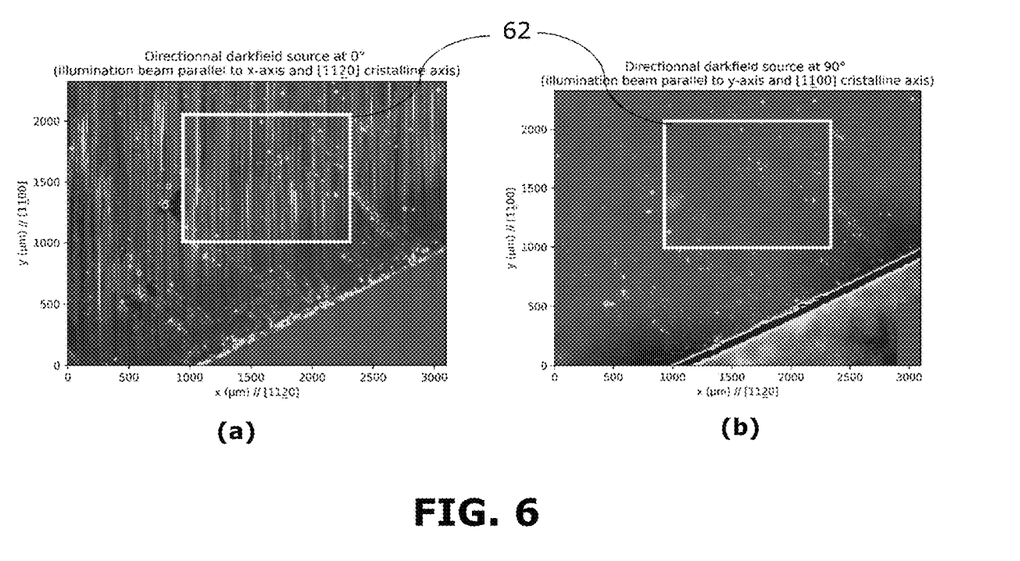
FIGS. 6a, 6b illustrate a comparative example of measurements realized on a 4H—SiC wafer with an epitaxial layer, in directional dark field with an illumination light source in the first position and the second position, respectively.

FIG. 6 illustrates another example of crystalline defect detection in a 4H—SiC substrate.

FIG. 6(*a*) shows a measurement of a step bunching obtained with an illuminating beam parallel to the [11$\bar{2}$0] crystalline axis, i.e., with an illumination light source being in the first position.

FIG. 6(*b*) shows the same measurement with the illumination in the perpendicular direction, i.e., with an illuminating beam perpendicular to the [11$\bar{2}$0] axis. The illumination light source is then in the second position. As it can be observed, notably in the area 62, the contrast of the step bunching defects practically drops to zero for this illumination direction. It can also be observed that other types of detects, such as non-crystalline defects, are visible with the two directions of illumination.

Figure 7:
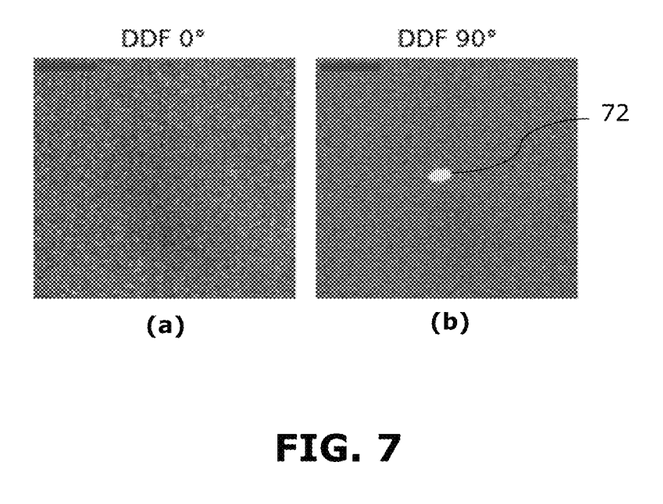
FIGS. 7a and 7b illustrate another comparative example of measurements realized on a 4H—SiC wafer with an epitaxial layer, in directional dark field with an illumination light source in the first position and the second position, respectively, FIG. 8 illustrate the variation of contrast of a crystalline defect in function of an angle of illumination in directional dark field.

FIG. 7 shows another example of crystalline defect detection in a 4H—SiC substrate.

In FIG. 7(a), the illumination light source is positioned in the first position, i.e., the illumination beam is in the angle plane and parallel to the [11$\bar{2}$0] axis. No crystalline defect is visible.

In FIG. 7(b), the illumination light source is positioned in the second position, i.e., the illumination beam is in the perpendicular plane and perpendicular to the [11$\bar{2}$0] axis. It reveals a carrot defect 72.

By comparing FIG. 6 and FIG. 7, it appears that some crystalline defects are visible only with an illumination in the first position, while other are visible only with an illumination in the second position. So, by using these two positions of illumination, it is possible to detect and classify efficiently these defects. It is also possible to discriminate non crystalline defects, which shall appear in a more similar way with both position of illumination, as shown for instance in FIGS. 6(a) and 6(b).

Figure 8:
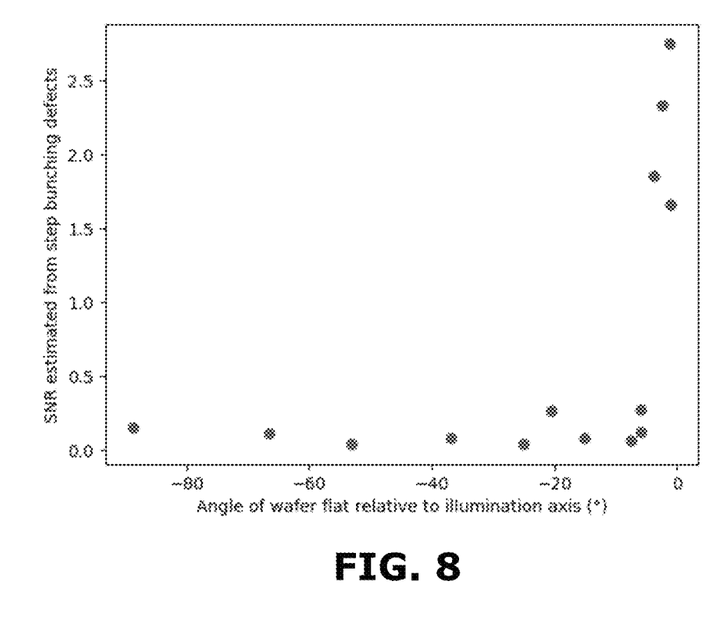

FIG. 8 shows the effect of the directional illumination on the detection of a step-bunching defect. The signal-to-noise ratio (SNR), i.e., the contrast of the step-bunching defect with respect to the surrounding 4H—SiC substrate, is shown as a function of the orientation in the X-Y plane of the illumination beam. 0° corresponds to the plane containing the [11$\bar{2}$0] crystalline axis, i.e., with the illumination light source being in the first position.

It appears that the contrast is optimal for a direction of illumination contained in the plane with the [11$\bar{2}$0] axis and falls quickly for a direction of illumination deviating from that orientation. As shown on the graph, the contrast is above null or noise level for angles smaller than 10 degrees (in absolute value), and better for angles smaller than 5 degrees.

Figure 9:
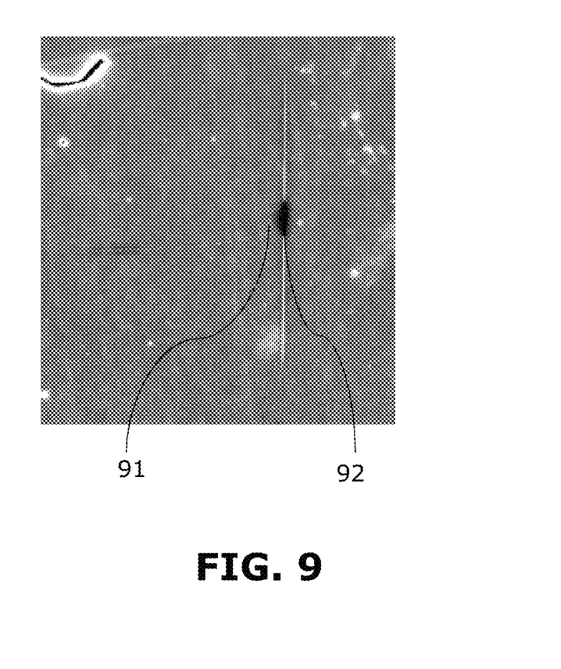
FIG. 9 illustrates an example of measurement realized according to the invention in a SiC substrate using photoluminescence.

FIG. 9 illustrates an example of measurements in a SiC substrate carried out with the photoluminescence configuration, without illumination with an illumination light source. Crystalline defects also appear as contrasted patterns on a background, having for many of them characteristic shapes. So, the detection step 403 may comprise any known technique for image processing and classification, such as thresholding, segmentation, pattern detection, blob analysis, etc.

FIG. 9 shows a micropipe defect 91 that also caused a polytype inclusion 92, detected by photoluminescence with an excitation wavelength of 310 nm and a long-pass filter at 650 nm. The micropipe 91 is the white dot pointed by the reference sign 91. The polytype inclusion 92 is the dark triangle pointed by reference 92.

Figure 10:
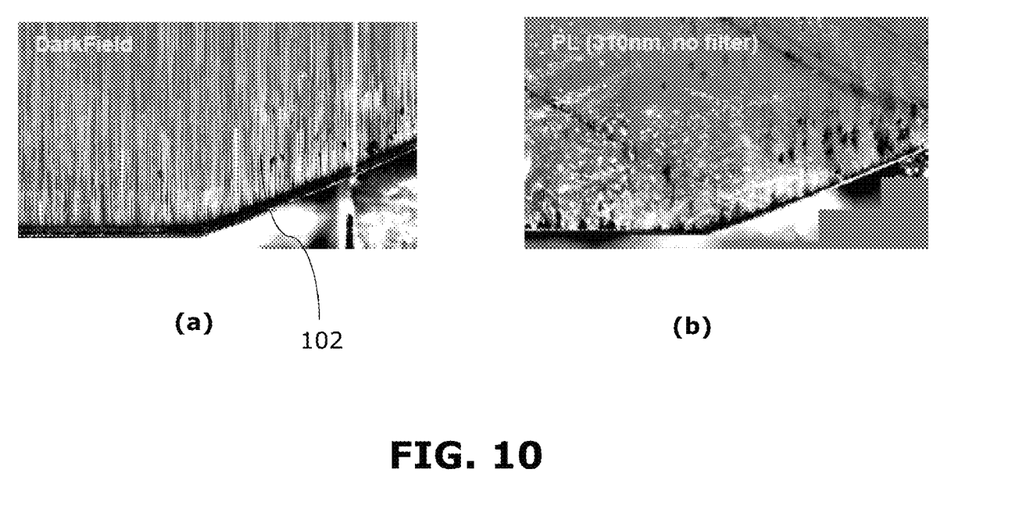
FIGS. 10a and 10b illustrate comparative measurements obtained respectively with directional dark field and photoluminescence.

FIGS. 10(a) and 10(b) show comparative examples of measurements done with DDF and PL.

FIG. 10(a) shows a step bunching defect measured in the directional dark-field configuration. It is clearly visible.

FIG. 10(b) shows the same field of view as the image of FIG. 10(a), measured by photoluminescence with an excitation wavelength of 310 nm, and no filter at the detection. The step bunching defect is no longer visible.

These examples illustrate how measurements in the directional dark-field configuration and in photoluminescence may be used in a complementary fashion to obtain a full characterization of crystalline defects in substrates. For instance, in the examples illustrated, step bunching can be efficiently detected with DDF in the right orientation (FIGS. 6a and 10a) but not with PL (FIG. 10b). Micropipes can be detected with both DDF (FIG. 5a) and PL (FIG. 9), but appear more clearly with DDF. Stacking faults (FIG. 5a) and polytype inclusions (FIG. 9) appear clearly on PL images.

So, depending on the defects which are sought, various recipe in terms of acquisition configuration and processing can be implemented to detect and classify defects.

Of course, the invention is not limited to the examples detailed above.

The invention claimed is:

1. A device for detecting crystalline defects in an off-axis monocrystalline substrate, wherein a normal to the surface of the substrate is tilted with respect to the crystallographic growth axis by a tilt angle, the tilt angle being contained in a plane, called angle plane, perpendicular to the surface, the device comprising:
   at least one detector;
   at least one illumination light source configured to illuminate the substrate with an illuminating light beam, the at least one illumination light source being arranged in at least one of a first position and a second position;
   at least one excitation light source configured to illuminate the substrate with an excitation light beam configured to produce an emission of photoluminescence light by the substrate;
   imaging means configured to image the substrate according to a field of view on the at least one detector, said at least one detector producing at least one image of the substrate; and
   processing means configured to detect crystalline defects using said at least one image of the substrate,
wherein the at least one illumination light source and the imaging means are arranged in a dark-field configuration; and
wherein in the first position, the at least one illumination light source is arranged such that the illuminating light beam is parallel or quasi-parallel to the angle plane, and in the second position, the at least one illumination light source is arranged such that the illuminating light beam is parallel or quasi-parallel to a plane, called perpendicular plane, containing the normal to the surface and being perpendicular to the angle plane.

2. The device according to claim 1, wherein in the first position, the at least one illumination light source is arranged such that the illuminating light beam is parallel to a plane containing the normal to the surface of the substrate and forming an angle smaller than +/−100 with the angle plane.

3. The device according to claim 1, wherein in the second position, the at least one illumination light source is arranged such that the illuminating light beam is parallel to a plane containing the normal to the surface of the substrate and forming an angle smaller than +/−10° with the perpendicular plane.

4. The device according to claim 1, which further comprises an illumination light source arranged in a third position different from the first and second positions and configured to illuminate the substrate with a supplemental illuminating light beam.

5. The device according to claim 4, wherein in the third position, the illumination light source is arranged such that the illuminating light beam is parallel to a plane containing the normal to the surface of the substrate and forming an angle larger than +/−5° with the angle plane and with the perpendicular plane, respectively.

6. The device according to claim 1, wherein the at least one illumination light source and/or the at least one excitation light source are arranged such that a direction of the illuminating light beam and/or the excitation light beam, respectively, is within an angle of 20°-89°, to the normal of the surface of the substrate.

7. The device according to claim 1, wherein the at least one excitation light source is arranged to emit selectively excitation light beam(s) at different excitation wavelengths.

8. The device according to claim 1, further comprising optical filter means arranged between the substrate and at last one of the detectors and configured to filter the light issued from the substrate according to one or more defined spectral bands.

9. The device according to claim 8, further comprising a filter holder configured to position selectively a plurality of spectral filters between the substrate and at least one of the detectors.

10. The device according to claim 1, comprising at least two detectors, and at least one filter or dichroic filter configured to pass the light in different spectral bands to the respective detectors.

11. A method for detecting crystalline defects in an off-axis monocrystalline substrate, wherein a normal to the surface of the substrate is tilted with respect to the crystallographic growth axis by a tilt angle, the tilt angle being contained in a plane, called angle plane, perpendicular to the surface of the substrate, the method being implemented with a device comprising at least one detector, at least one illumination light source, at least one excitation light source, imaging means, and processing means, the at least one illumination light source and the imaging means being arranged in a dark-field configuration, the method comprising:
  illuminating, with the at least one illumination light source, the substrate with an illuminating light beam, the at least one illumination light source being arranged in at least one of a first position and a second position;
  illuminating, with the at least one excitation light source, the substrate with an excitation light beam configured to produce an emission of photoluminescence light by the substrate,
  imaging, with the imaging means, the substrate according to a field of view on the at least one detector;
  producing with said at least one detector at least one image of the substrate; and
  detecting, with the processing means, crystalline defects using said at least one image of the substrate;
wherein in the first position, the at least one illumination light source is arranged such that the illuminating light beam is parallel or quasi-parallel to the angle plane, and in the second position, the at least one illumination light source is arranged such that the illuminating light beam is parallel or quasi-parallel to a plane, called perpendicular plane, containing the normal to the surface and being perpendicular to the angle plane.

12. The method according to claim 11, which comprises at least one of the following steps:
  illuminating the substrate with an illumination light source arranged in the first position, and producing an image of the substrate;
  illuminating the substrate with an illumination light source arranged in the second position, and producing an image of the substrate;
  simultaneously illuminating the substrate with a first and a second illumination light source respectively arranged in the first and the second position, and producing an image of the substrate; and
  illuminating (404) the substrate with an illumination light source arranged in a third position different from the first and second positions, and producing a supplemental image of the substrate.

13. The method according to claim 11, which further comprises illuminating the substrate with at least one excitation light source and producing an image of the substrate with the photoluminescence light emitted by said substrate.

14. The method according to claim 11, which further comprises spectrally filtering the photoluminescence light, and producing one or several images of the substrate with the photoluminescence light in selected spectral ranges.

15. The method according to claim 11, which comprises sequentially illuminating the substrate with one or several excitation light beams having different excitation wavelengths, and producing images of the substrate with the photoluminescence light generated at the respective excitation wavelengths.

16. The method according to claim 11, which comprises simultaneously illuminating the substrate with at least one illumination light source and at least one excitation light source, and producing an image of said substrate.

* * * * *